(12) United States Patent
Miller et al.

(10) Patent No.: US 6,480,144 B1
(45) Date of Patent: Nov. 12, 2002

(54) WIRELESS COMMUNICATION BETWEEN COUNTERMEASURE DEVICES

(75) Inventors: Ronald Hugh Miller, Saline, MI (US); Manoharprasad K. Rao, Novi, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/683,653

(22) Filed: Jan. 30, 2002

(51) Int. Cl.[7] .............................................. G01S 13/93
(52) U.S. Cl. ............................ 342/72; 342/52; 342/60; 342/70; 342/71; 342/195; 367/93; 180/167; 180/169
(58) Field of Search .............................. 342/70, 71, 72, 342/175, 195, 27, 28, 52, 53–58, 60; 367/93–116; 180/167, 168, 169; 356/4.01

(56) References Cited

U.S. PATENT DOCUMENTS

| | | | |
|---|---|---|---|
| 4,381,829 A | 5/1983 | Montaron | |
| 5,142,278 A | 8/1992 | Moallemi et al. | |
| 5,629,689 A | 5/1997 | Curwood | |
| 5,712,784 A | 1/1998 | Fendt et al. | |
| 5,760,489 A | 6/1998 | Davis et al. | |
| 5,835,007 A | 11/1998 | Kosiak | |
| 5,841,367 A | 11/1998 | Giovanni | |
| 5,964,815 A | 10/1999 | Wallace et al. | |
| 6,067,031 A * | 5/2000 | Janky et al. | 342/72 |
| 6,249,242 B1 * | 6/2001 | Sekine et al. | 342/70 |
| 6,268,804 B1 * | 7/2001 | Janky et al. | 342/72 |

* cited by examiner

*Primary Examiner*—Bernarr E. Gregory
(74) *Attorney, Agent, or Firm*—Frank A. MacKenzie

(57) ABSTRACT

A collision countermeasure system (10) for an automotive vehicle (12) is provided. The collision countermeasure system (10) includes an object detection system (14) having at least one transceiver (34). The object detection system (14) generates and wirelessly transmits an object detection signal via a first transceiver. A countermeasure controller (16) wirelessly receives said object detection signal via a second transceiver and performs a countermeasure in response to said object detection signal. A method for performing the same is also provided.

22 Claims, 2 Drawing Sheets

WIRELESS COMMUNICATION BETWEEN COUNTERMEASURE DEVICES

BACKGROUND OF INVENTION

TECHNICAL FIELD

The present invention relates generally to collision countermeasure systems, and more particularly to a method and apparatus for performing a countermeasure within an automotive vehicle as to prevent a collision and minimize the likelihood of occupant injury.

BACKGROUND OF THE INVENTION

Collision countermeasure systems are becoming more widely used. Collision countermeasure systems detect objects or vehicles within close proximity of a host vehicle and perform safety operations so as to prevent or minimize the likelihood of a collision and any resulting injury to an occupant. Countermeasure systems exist in various passive and active forms. Passively, a countermeasure system may activate inflatable seat belts, seat belt pretensioners, airbags, or other passive countermeasures. Actively, a countermeasure system may perform actions including suspension height modifications, autonomously decreasing the traveling velocity of the vehicle by braking or reducing engine torque, accelerating the vehicle, steering the vehicle, or performing other active countermeasures known in the art. Actions such as suspension height modifications have the potential to reduce injuries to vehicle occupants and potential collision partners.

Countermeasure systems typically include an object detection system electrically coupled, using a wire-based system such as a CAN (Controller Area Network), to a countermeasure controller. The object detection system may include various sensors such as ultrasonic sensors, cameras, transponders, radar sensors, or other sensors known in the art. An object is detected by the object detection system, which generates an object detection signal that is evaluated by the collision countermeasure controller. The countermeasure controller, in response to the object detection signal, determines appropriate countermeasures to perform.

The total time required to implement a countermeasure includes the time required to sense an object, communicate object information to the controller, evaluate the object information by the controller, signal a countermeasure, and perform the countermeasure. Therefore, the delay between object detection and countermeasure performance varies depending upon the object detection system, the communication system, the countermeasure controller, and the countermeasure being performed. All of these communications take place across wire-based communication paths, which can be relatively slow. The longer the time involved in performing a countermeasure the lower the probability of avoiding a collision or preventing an injury.

Traditional collision countermeasure systems that utilize a wire-based system such as a High Speed Controller Area Network (HS-CAN) also have other time limitations when certain vehicle conditions exist. HS-CAN type systems are serial in nature wherein messages are transmitted and received serially, sometimes referred to as a queue. Thus, they are acted upon one at a time. A vehicle condition may exist when a large number of signals are being communicated at the same time, thereby filling the queue. When several messages are in the queue the time delay in performing a countermeasure can be increased.

An ongoing concern for safety engineers is to provide a safer automotive vehicle with increased collision avoidance and minimize injury prevention response time capability. Therefore, it would be desirable to provide an improved collision countermeasure system for an automotive vehicle that decreases the time required to perform a collision countermeasure and maintains at least the same system reliability of current countermeasure systems.

SUMMARY OF INVENTION

The present invention provides an improved method and apparatus for performing a collision countermeasure within an automotive vehicle. In an embodiment, a collision countermeasure system for an automotive vehicle is provided. The collision countermeasure system includes an object detection system having at least one transceiver. The object detection system generates and wirelessly transmits an object detection signal via a first transceiver. A countermeasure controller wirelessly receives said object detection signal via a second transceiver and performs a countermeasure in response to said object detection signal. A method for performing the same is also provided.

One of several advantages of the present invention is that it provides a collision countermeasure system that wirelessly transmits and receives signals between countermeasure devices at an increased rate over traditional wire-based countermeasure systems. The present system decreases the amount of time required to perform a countermeasure and potentially decreases the probability of a collision or occupant injury.

Additionally, the present invention provides increased reliability by optionally having the ability to transmit and receive signals between countermeasure devices wirelessly or by wire.

Furthermore, the present invention provides increased versatility in determining where to locate a countermeasure device within a vehicle. Thereby, providing vehicle design engineers with increased vehicle systems layout flexibility.

Another advantage of the present invention is that by optionally eliminating the need for wire harnesses between countermeasure devices in the collision mitigation system the production costs of a vehicle may be decreased.

The present invention itself, together with attendant advantages, will be best understood by reference to the following detailed description, taken in conjunction with the accompanying figures.

BRIEF DESCRIPTION OF DRAWINGS

For a more complete understanding of this invention reference should now be had to the embodiments illustrated in greater detail in the accompanying figures and described below by way of examples of the invention wherein.

DETAILED DESCRIPTION

While the present invention is described with respect to a method and apparatus for performing a countermeasure within an automotive vehicle, the present invention may be adapted to be used in various systems including: forward collision warning systems, collision avoidance systems, vehicle systems, robotic systems, or other systems that may require collision mitigation.

In the following description, various operating parameters and components are described for one constructed embodiment. These specific parameters and components are included as examples and are not meant to be limiting.

Also, in the following description the term "performing" may include activating, deploying, initiating, powering, and other terms known in the art that may describe the manner in which a countermeasure may be operated.

Additionally, in the following description the term "countermeasure" may refer to an object or may be referring to an action. For example, a countermeasure may be performed or a countermeasure may be activated. An airbag is a countermeasure. A controller may perform a countermeasure by signaling an airbag to deploy.

Moreover, a countermeasure device may be any device within an automotive vehicle that is used in conjunction with a collision countermeasure system including: a controller, a vehicle system, a countermeasure, an indicator, or other countermeasure device known in the art.

Figure 1:
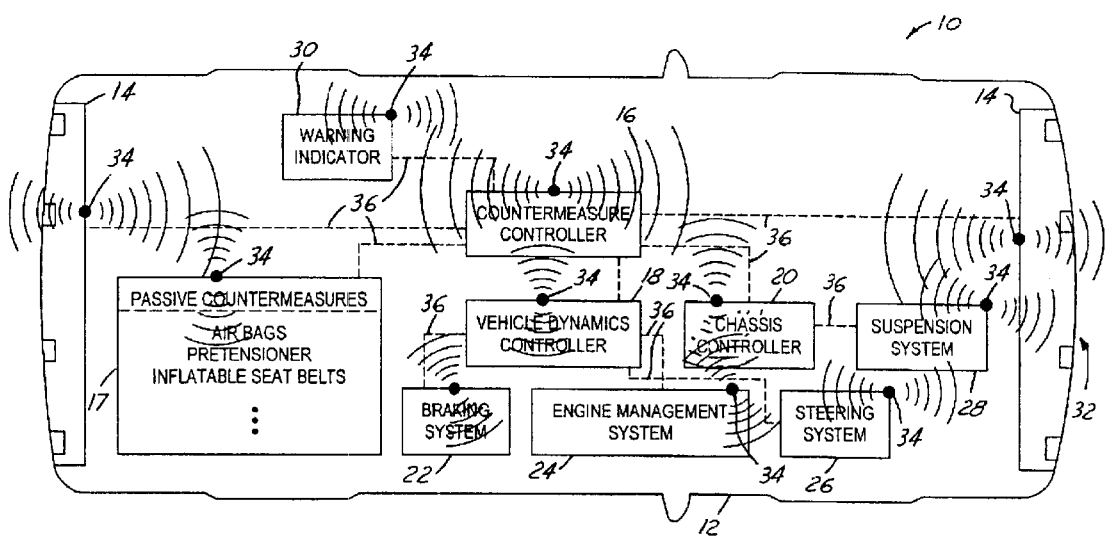
FIG. 1 is a block diagram of a collision countermeasure system for an automotive vehicle in accordance with an embodiment of the present invention.

Referring now to FIG. 1, a block diagram of a collision countermeasure system 10 for an automotive vehicle 12 in accordance with an embodiment of the present invention is shown. The system 10 includes a countermeasure controller 16, in operative communication with various countermeasure devices 17 and other vehicle systems. These vehicle systems include an object detection system 14 for detecting objects within a close proximity of the vehicle 12. As well as a braking system 22, a engine management system 24, a steering system 26, a suspension system 28, a warning indicator 30, and other related countermeasure devices. The present invention, as described in more detail below, wirelessly links these devices to improve countermeasure performance.

The object detection system 14 generates object detection signals and wirelessly transmits the object detection signals to a countermeasure controller 16 where they are wirelessly received. The countermeasure controller 16 in response to the object detection signals generates and transmits collision assessment signals, and performs countermeasures as a function of the collision assessment signals. Countermeasure signals are wirelessly received by countermeasure devices such as passive countermeasures 17, a vehicle dynamics controller 18, or a chassis controller 20. The countermeasure device that receives the countermeasure signal is either activated, being a passive countermeasure 17, or performs active countermeasures in response to the countermeasure signals.

The object detection system 14 may be as simple as a single motion sensor or may be as complex as a combination of multiple motion sensors, accelerometers, cameras, and transponders. The object detection system 14 may contain any of the above mentioned sensors and others such as radar, lidar, ultrasonic, active infrared, passive infrared, telematic, or other sensors known in the art. When radar sensors are used, the object detection system 14 may be a radar control unit (RCU). The object detection system may be adjusted via an object detection system adjustment signal wirelessly transmitted by the controller 16. The object detection system adjustment signal may include information such as adjusting signal amplification, sensor positioning and alignment, signal filtering, or other adjustment information.

The controller 16 as well as the vehicle dynamics controller 18 and the chassis controller 20, are preferably microprocessor-based such as a computer having a central processing unit, memory (RAM and/or ROM), and associated input and output buses. The controller 16, the vehicle dynamics controller 18, and the chassis controller 20 may be a portion of a central vehicle main control unit, an interactive vehicle dynamics module, a restraints control module, a main safety controller, or a stand-alone controller.

Controller 16 determines the potential for a collision between the vehicle 12 and an object. The controller 16 assesses the environment and current situation that the vehicle 12 is encountering. In assessing the environment and current situation the controller 16 uses error checking techniques known in the art so as to prevent countermeasure actions in response to false object detection signals, thereby increasing reliability of the system 10. Controller 16 in response to the environment and a current situation determines whether any countermeasures should be performed. The countermeasures may include signaling a passive countermeasure 17, performing an active countermeasure, or taking no action. The controller may also wirelessly receive countermeasure status signals containing status information corresponding to a countermeasure device. The controller 16 in receiving a countermeasure status signal, in combination with the object detection signal, may determine whether to perform a countermeasure.

The passive countermeasures 17 may include internal air bag control, seatbelt control, knee bolster control, head restraint control, load limiting pedal control, load limiting steering control, seatbelt pretensioner control, external air bag control, pedestrian protection device control, and other passive countermeasures known in the art.

Active countermeasures may include brake control, throttle control, steering control, suspension control, transmission control, and other vehicle control systems. The controller 16 may autonomously operate the vehicle 12 by signaling controllers such as the vehicle dynamics controller 18 or the chassis controller 20. The controller 16 may also signal the warning indicator 30 of an impending potential collision so that the vehicle operator may actively perform a precautionary action.

The vehicle dynamics controller 18, in response to a countermeasure signal, signals either the braking system 22, the engine management system 24, the steering system 26, or a combination thereof to adjust the traveling velocity and trajectory of the vehicle 12.

The chassis controller 20, in response to a collision assessment signal, signals the suspension system 28 to adjust the orientation of the vehicle 12. In adjusting the orientation of the vehicle 12, the chassis controller 20 signals the suspension system 28 to raise or lower portions of the vehicle 12. For example, when the controller 16 signals the chassis controller 20 to perform an active countermeasure of "dipping", the chassis controller 20 signals the suspension system 28 to lower the height of a front end 32 using methods known in the art.

The indicator 30 generates a warning signal in response to the countermeasure signal, which is indicated to the vehicle operator and others. The indicator 30 may include a video system, an audio system, an LED, a light, global positioning system, a heads-up display, a headlight, a taillight, a display system, a telematic system or other visual or audible indicator. The indicator 30 may supply warning signals, collision-related information, external-warning signals to objects, systems or pedestrians located outside of the vehicle 12, or other pre and post collision information.

Each countermeasure device may have a transceiver 34 or be part of a communication network so as to transmit and receive signals containing countermeasure and status related information. The following are examples of an embodiment for a transceiver and/or wireless network: a Bluetooth radio/ antenna pair as part of the IEEE 802.15b standard, a local area network (LAN) 802.11a, b, g system, or a LAN 802.11a R/A system. Bluetooth type systems use parallel processing, and, therefore, have advantages over serial, queued, communication systems. Of course, other similar transceivers or networks known in the art may be utilized.

The present invention, by using wireless transmission techniques to transmit and receive signals between countermeasure devices, increases transmission rates over traditional systems. Wireless communication rates of the example transceiver and wireless networks described above range from 1.3 to 2.6 ms, which is approximately an order of magnitude faster than traditional wire-based collision countermeasure systems. An additional benefit with using wireless communication between countermeasure devices is the increased versatility of determining where to locate these devices in a vehicle having limited space, without wiring limitations.

Optionally, as an additional reliability precaution the present invention may also couple two or more countermeasure devices by wire. In so doing, during a potential collision situation when perhaps a portion of the system 10, either a wireless portion or a wire-based portion, is inoperable the other may function as a backup. A possible wire configuration is illustrated by representative dashed lines 36.

Figure 2:
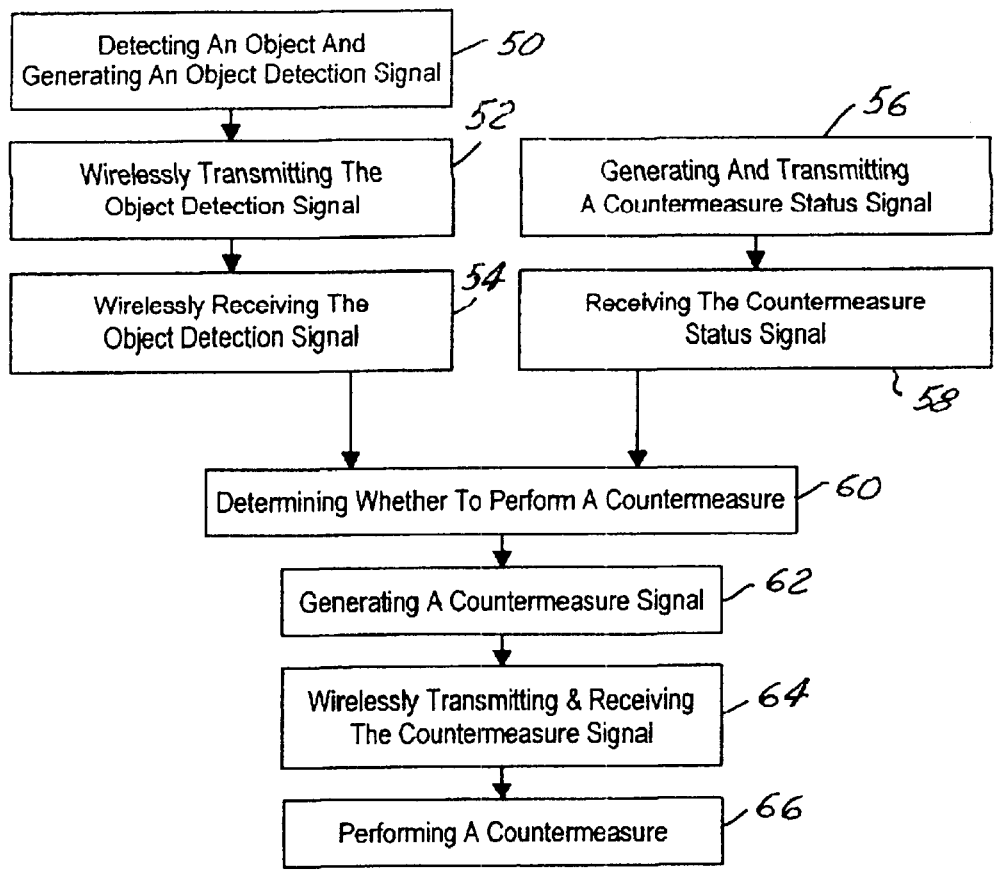
FIG. 2 a logic flow diagram illustrating a method of performing a countermeasure utilizing the collision countermeasure system of FIG. 1 in accordance with an embodiment of the present invention.

Referring now to FIG. 2, a logic flow diagram illustrating a method of performing a countermeasure utilizing the system 10 in accordance with an embodiment of the present invention is shown.

In step 50, the system is activated upon the detection of an object within the field of view of the object detection system. In response, an object detection signal is generated, as stated above.

In step 52, the object detection signal is wirelessly transmitted to other countermeasure devices. The object detection signal may be transmitted to the controller 16 or other countermeasure devices on the vehicle 12.

In step 54, the controller 16 receives the object detection signal and processes data to determine the vehicle threat assessment.

In step 56, passive and active countermeasure devices are generating and transmitting countermeasure status signals, so that the controller 16 is better informed in determining what countermeasures to perform. The countermeasure status signals may be continuously transmitted or may be signaled to transmit a countermeasure status signal when an object is detected.

In an alternate embodiment of the current invention, which uses a hybrid wireless and wire-based collision countermeasure system, passive and active countermeasure devices may generate and continuously transmit the countermeasure status signals to the controller 16 via a wire based system for its use in determining what countermeasures to perform. In this embodiment, the passive and active countermeasures need only to be equipped with wireless receivers to receive the countermeasure signals from the controller 16.

In step 58, the controller 16 receives the countermeasure status signals.

In step 60, controller 16 determines whether to perform a countermeasure in response to the object detection signal and the countermeasure status signals. In less sophisticated systems where many countermeasure devices are incapable of transmitting a countermeasure status signal the controller 16 may decide whether to perform a countermeasure solely in response to the object detection signal. In more sophisticated systems, such as those having occupant positioning prediction, the controller 16 may determine whether to perform a countermeasure in response to other occupant, object, and vehicle related information.

In step 62, the controller 16 generates a collision assessment signal containing information such as what countermeasures to perform and when and how to perform them.

In step 64, controller 16 wirelessly transmits the collision assessment signal to other countermeasure devices, which wirelessly receive the collision assessment signal.

In step 66, the countermeasures, described in the collision assessment signals, are performed by the corresponding countermeasure devices accordingly. When the collision assessment signal is transmitted to a passive countermeasure 17 directly the controller 16 may simply power on or off the passive countermeasure and directly control the rate, magnitude, or duration of the passive countermeasure 17. When the collision assessment signal is transmitted to a controller or a similar countermeasure device the controller 16 may transmit collision assessment signals and the receiving controller may perform a countermeasure in response to the collision assessment signals.

The present invention provides a collision countermeasure system that incorporates wireless communication techniques as to minimize system response time from when an object is detected until a countermeasure is performed. The minimized response time decreases the probability of a collision or an injury occurring. The present invention also by optionally combining traditional wire-based capabilities with wireless communication techniques increases the overall reliability of a collision countermeasure system.

The above-described apparatus, to one skilled in the art, is capable of being adapted for various purposes and is not limited to the following systems: forward collision warning systems, collision avoidance systems, collision injury mitigation systems, vehicle systems, robotic systems or other systems that may require collision mitigation. The above-described invention may also be varied without deviating from the spirit and scope of the invention as contemplated by the following claims.

What is claimed is:

1. A collision countermeasure system for an automotive vehicle comprising:

an object detection system having at least one transceiver, said object detection system generating and wirelessly transmitting an object detection signal via a first transceiver;

a countermeasure controller wirelessly receiving said object detection signal via a second transceiver and performing a countermeasure in response to said object detection signal.

2. A system as in claim 1 wherein said object detection system comprises at least one of: a motion sensor, a camera, a transponder, a radar sensor, a lidar sensor, an ultrasonic sensor, an active infrared sensor, a passive infrared sensor, and a telematic sensor.

3. A system as in claim 1 wherein said countermeasure controller generates and wirelessly transmits a collision assessment signal in response to said object detection signal, said system further comprising:

a chassis controller wirelessly receiving said collision assessment signal and performing a countermeasure in response to said collision assessment signal.

4. A system as in claim 1 wherein said countermeasure controller generates and wirelessly transmits a collision assessment signal in response to said object detection signal, said system further comprising:
  a vehicle dynamics controller wirelessly receiving said collision assessment signal and performing a countermeasure in response to said collision assessment signal.

5. A system as in claim 1 wherein said countermeasure controller generates and wirelessly transmits a collision assessment signal in response to said object detection signal and wherein said collision assessment signal comprises at least one of a brake control signal, a throttle control signal, a steering control signal, a suspension control signal, and a transmission control signal.

6. A system as in claim 1 wherein said countermeasure controller generates and wirelessly transmits a collision assessment signal in response to said object detection signal and wherein said collision assessment signal comprises at least one of an internal air bag signal, a seatbelt signal, a knee bolster signal, a head restraint signal, a load limiting pedal signal, a load limiting steering signal, a pretensioner signal, an external air bag signal, and a pedestrian protection device signal.

7. A system as in claim 1 wherein:
  said countermeasure controller generates and wirelessly transmits an object detection system adjustment signal; and wherein
  said object detection system receives said object detection system adjustment signal and performs a corresponding adjustment in response to said object detection system adjustment signal.

8. A system as in claim 1 further comprising:
  a countermeasure device, a vehicle controller, or a vehicle system generating and wirelessly transmitting a countermeasure status signal; and wherein
  said countermeasure controller wirelessly receives said countermeasure status signal and performs a countermeasure as a function of said countermeasure status signal and object detection signal.

9. A system as in claims 8 wherein said countermeasure status signal comprises, a countermeasure device status signal, or a vehicle system status signal or a vehicle controller status signal.

10. A system as in claim 1 further comprising:
  a countermeasure device, a vehicle controller, or a vehicle system generating and transmitting a wire-based countermeasure status signal; and wherein
  said countermeasure controller receives said wire-based countermeasure status signal and performs a countermeasure as a function of said countermeasure status signal and object detection signal.

11. A system as in claims 10 wherein said countermeasure status signal comprises, a countermeasure device status signal, or a vehicle system status signal or a vehicle controller status signal.

12. A system as in claim 1 wherein:
  said countermeasure controller generates and wirelessly transmits a warning signal in response to said object detection signal; and comprising
    a warning indicator wirelessly receiving and indicating said warning signal.

13. A method of performing a countermeasure for an automotive vehicle having a collision countermeasure system comprising:
  detecting an object and generating an object detection signal;
  wirelessly transmitting said object detection signal;
  wirelessly receiving said object detection signal; and
  performing a countermeasure in response to said object detection signal.

14. A method as in claim 13 wherein performing a countermeasure comprises performing at least one of: activating an air bag, activating a pretensioner, activating an inflatable seat belt, nose dipping the vehicle.

15. A method as in claim 13 further comprising:
  wirelessly transmitting a collision assessment signal in response to said object detection signal;
  wirelessly receiving said collision assessment signal; and
  performing a countermeasure as a function of said collision assessment signal.

16. A method as in claim 15 wherein performing a countermeasure in response to said collision assessment signal comprises at least one of: adjusting brake pressure, adjusting engine torque, and adjusting chassis orientation.

17. A method as in claim 13 further comprising:
  wirelessly transmitting a countermeasure status signal;
  wirelessly receiving said countermeasure status signal; and
  performing a countermeasure as a function of said countermeasure status signal and object detection signal.

18. A method as in claim 17 wherein wirelessly transmitting a countermeasure status signal comprises transmitting a countermeasure status signal from at least one of: a countermeasure device, a vehicle dynamics controller, a chassis controller, a braking system, a steering system, and an engine management system.

19. A collision countermeasure system for an automotive vehicle comprising:
  an object detection system generating and transmitting an object detection signal via a wireless network;
  a countermeasure device, a vehicle controller, or a vehicle system generating and transmitting a countermeasure status signal via said wireless network; and
  a countermeasure controller receiving said object detection signal and said countermeasure status signal via said wireless network and performing a countermeasure in response to said object detection signal and said countermeasure status signal.

20. A system as in claims 19 further comprising:
  said countermeasure controller generating a collision assessment signal in response to said object detection signal and said countermeasure status signal;
  said countermeasure controller transmitting said collision assessment signal via said wireless network to said countermeasure device, vehicle controller, or vehicle system;
  said countermeasure device, vehicle controller, or vehicle system receiving said collision assessment signal via said wireless network and performing a countermeasure in response to said collision assessment signal.

21. A collision countermeasure system for an automotive vehicle comprising:
  an object detection system generating and transmitting an object detection signal via a wireless network;
  a countermeasure device, a vehicle controller, or a vehicle system generating and transmitting a countermeasure status signal via a wire-based system; and a countermeasure controller receiving said object detection signal and said countermeasure status signal via said wireless network and wire-based networks and performing a countermeasure in response to said object detection signal and said countermeasure status signal.

22. A system as in claims 21 further comprising:

said countermeasure controller generating a collision assessment signal in response to said object detection signal and said countermeasure status signal;

said countermeasure controller transmitting said collision assessment signal via said wireless network to said countermeasure device, vehicle controller, or vehicle system;

said countermeasure device, vehicle controller, or vehicle system receiving said collision assessment signal via said wireless network and performing a countermeasure in response to said collision assessment signal.

* * * * *